(12) United States Patent
Vite Cadena et al.

(10) Patent No.: US 11,377,011 B2
(45) Date of Patent: Jul. 5, 2022

(54) VEHICLE HOLDING UNIT

(71) Applicant: NISSAN NORTH AMERICA, INC., Franklin, TN (US)

(72) Inventors: Manuel Alejandro Vite Cadena, Farmington Hills, MI (US); Matthew Cole, Franklin, TN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 158 days.

(21) Appl. No.: 16/588,099

(22) Filed: Sep. 30, 2019

(65) Prior Publication Data

US 2021/0094455 A1 Apr. 1, 2021

(51) Int. Cl.
*F16M 11/00* (2006.01)
*B60N 3/10* (2006.01)

(52) U.S. Cl.
CPC ............. *B60N 3/104* (2013.01); *B60N 3/103* (2013.01); *B60N 3/106* (2013.01)

(58) Field of Classification Search
CPC ........ B60N 3/103; B60N 3/106; B60N 3/104; B60N 3/108
See application file for complete search history.

(56) References Cited

U.S. PATENT DOCUMENTS

| | | | |
|---|---|---|---|
| 5,243,684 A * | 9/1993 | Edwards | A47J 31/005 219/436 |
| 5,508,494 A * | 4/1996 | Sarris | A47J 31/005 219/385 |
| 5,720,171 A * | 2/1998 | Osterhoff | A47J 36/2461 62/298 |
| 6,119,461 A * | 9/2000 | Stevick | F25B 21/04 62/3.3 |
| 6,422,300 B1 | 7/2002 | Wylin | |
| 7,757,888 B2 * | 7/2010 | Ogura | B60N 3/102 220/737 |
| 9,090,213 B2 * | 7/2015 | Lawlor | B60R 1/00 |
| 10,267,558 B2 * | 4/2019 | Oh | B60N 3/104 |
| 2006/0186297 A1 * | 8/2006 | Lore | B60N 3/103 248/311.2 |
| 2010/0089901 A1 * | 4/2010 | Montana | A47J 36/2466 219/385 |
| 2016/0236605 A1 * | 8/2016 | Doi | B60N 3/106 |

FOREIGN PATENT DOCUMENTS

| | | |
|---|---|---|
| CN | 105835743 A | 8/2016 |
| EP | 3050748 A1 | 2/2016 |
| EP | 3159212 A1 | 3/2016 |
| KR | 20040053913 A | 6/2004 |
| WO | 2016047842 A1 | 3/2016 |

* cited by examiner

*Primary Examiner* — Amy J. Sterling
(74) *Attorney, Agent, or Firm* — Global IP Counselors, LLP

(57) ABSTRACT

A vehicle holding unit includes a cupholder and an electronic heating unit. The cupholder has a sidewall defining a cup receiving area. The sidewall includes a heat source for providing heat to the cupholder. The electronic heating unit is integrated with the sidewall. The electronic heating unit has an electrical connector configured to be electrically connected to another electrical connector of a vehicle center console to draw electrical power from the another electrical connector to power the heat source.

19 Claims, 5 Drawing Sheets

VEHICLE HOLDING UNIT

BACKGROUND

Field of the Invention

The present invention generally relates to vehicle holding unit. More specifically, the present invention relates to vehicle holding unit.

Background Information

Generally, vehicles are equipped with cupholders as a means by which beverage containers, e.g. beverage can, cup, bottle, can be held in place while the vehicle is in motion or otherwise. A cupholder is commonly attached to a console within the vehicle, the back side of a seat, or a predetermined location that is accessible to the vehicle's occupants. The structure of a cupholder typically includes a hole or cavity in which a beverage container can be inserted.

SUMMARY

In view of the state of the known technology, one aspect of the present disclosure is to provide a vehicle holding unit comprising a cupholder and an electronic heating unit. The cupholder has a sidewall defining a cup receiving area. The sidewall includes a heat source for providing heat to the cupholder. The electronic heating unit is integrated with the sidewall. The electronic heating unit has an electrical connector configured to be electrically connected to another electrical connector of a center console of the vehicle to power the heat source.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
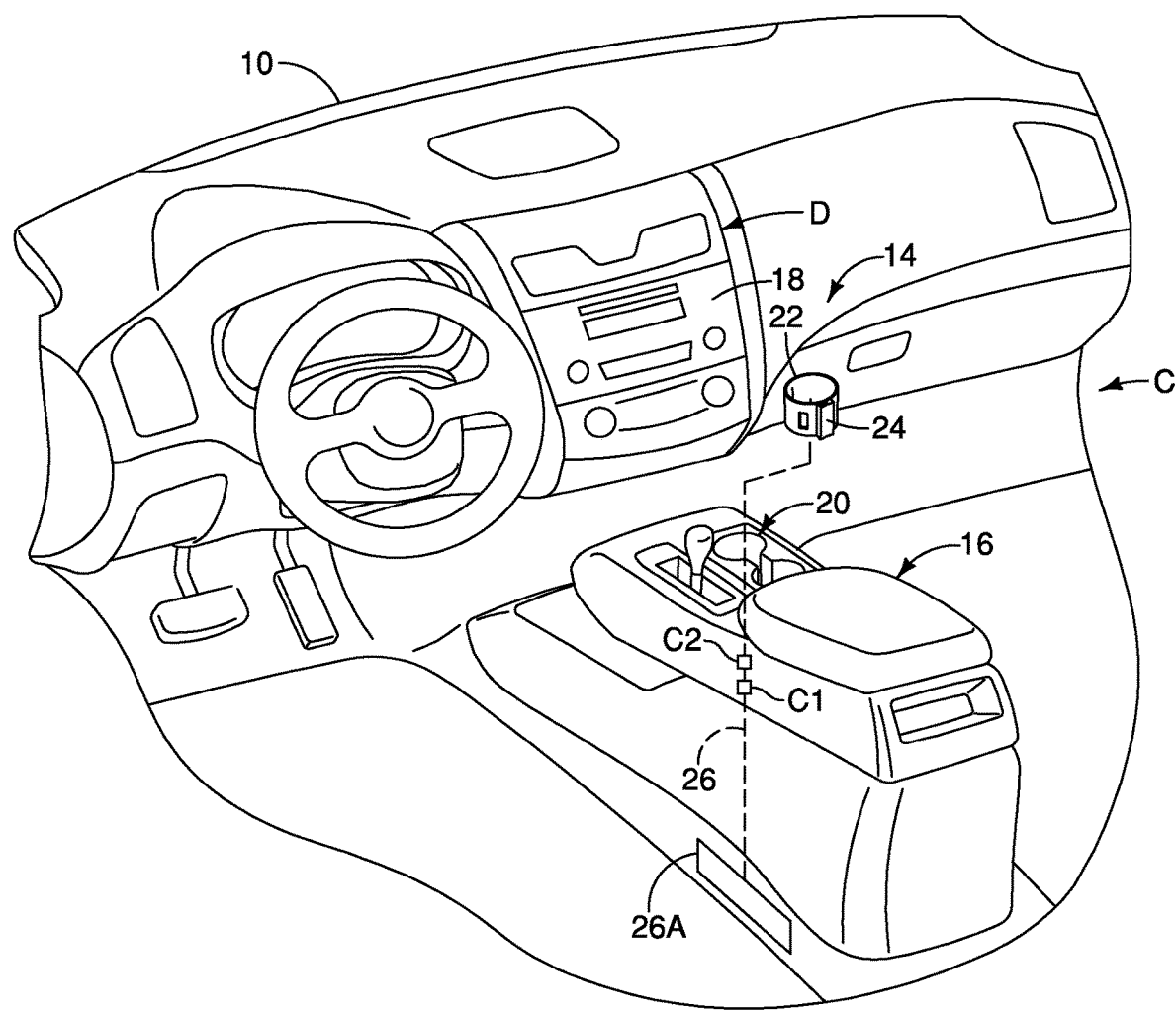
FIG. 1 is an interior of a vehicle having a center console equipped with a vehicle holding unit of the illustrated embodiment.

Referring now to FIG. 1, an interior of a vehicle 10 having a vehicle holding unit 14 is illustrated in accordance with an illustrated embodiment. In particular, the vehicle holding unit 14 is provided to the vehicle's 10 center console 16 that is in the passenger compartment C. The vehicle holding unit 14 of the illustrated embodiment is considered a vehicle interior accessory that is provided to the center console 16. The center console 16 includes certain control-bearing surfaces 18 for the vehicle 10. The center console 16 is provided in the passenger compartment C at an area running from the vehicle's dashboard D and merging with the transmission tunnel which runs between the front driver's and passenger's seats. The center console 16 can provide a control bearing surface 18 for instrumentation (e.g., outside temperature display) and passenger(s) controls units for controlling electrical components of the vehicle 10, such as the accessory components of the vehicle 10 (e.g., the vehicle's 10 audio system).

Typically, the center console 16 can additionally include a wide variety of storage compartments 20, such as one or more storage compartments 20 for beverage containers. The vehicle holding unit 14 of the illustrated embodiment is configured to be implemented with the storage compartment 20 of the center console 16 that is a conventional beverage containing compartment. The vehicle holding unit 14 is an accessory for containing an external beverage container 21 (diagrammatically shown in FIG. 6) at a desired temperature. It will be apparent to those skilled in the vehicle field from this disclosure that the vehicle holding unit 14 can alternatively be provided in other locations, such as the back side of a seat, or at another predetermined location that is accessible to the vehicle's 10 occupants.

As stated, the vehicle holding unit 14 is to be implemented with a conventional center console storage compartment 20. Alternatively, the vehicle holding unit 14 can include the storage compartment 20 of the center console 16. The vehicle holding unit 14 further comprises a cupholder 22 and an electronic heating unit 24 that are implemented with the storage compartment 20. In particular, the electronic heating unit 24 is provided to the cupholder 22 for heating the cupholder 22. Preferably, the electronic heating unit 24 is integrated with the cupholder 22 by being fixed to an exterior of the cupholder 22, as will be described below. The cupholder 22 and the electronic heating unit 24 are telescopically received in the storage compartment 20. In the illustrated embodiment, the cupholder 22 and the electronic heating unit 24 can be considered accessory components of the vehicle 10 that can be implemented with conventional components of the vehicle 10.

Figure 2:
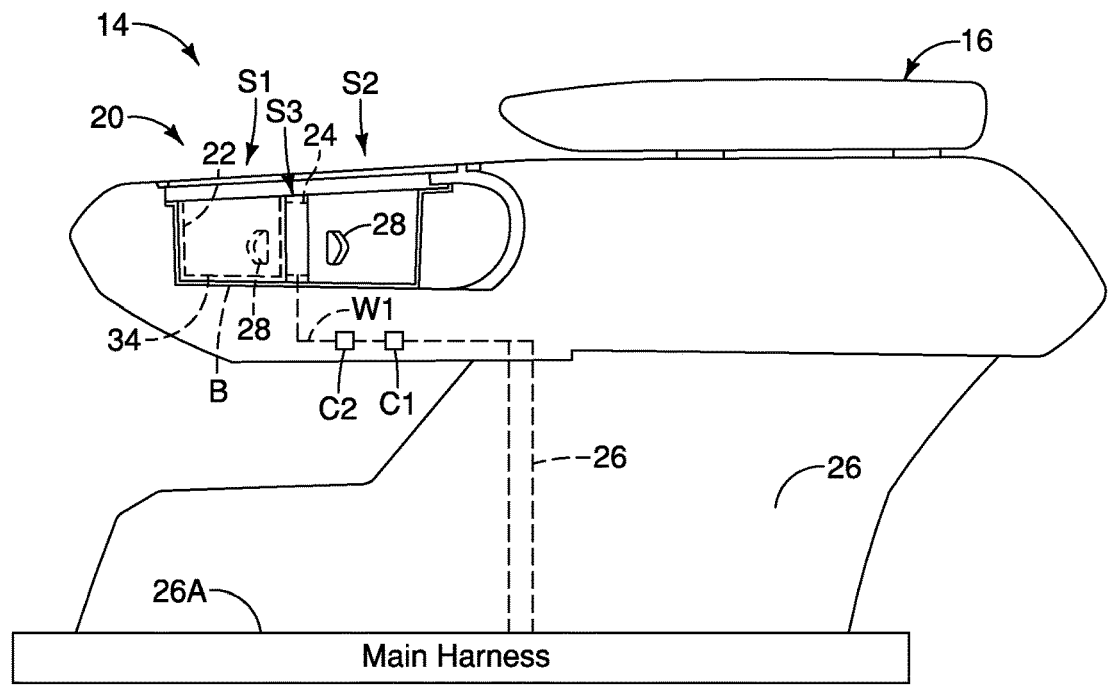
FIG. 2 is a diagrammatic view of a side of the center console having the vehicle holding unit.

As shown in FIGS. 1 and 2, the center console 16 includes an electrical connector C1 that can be any one of a socket, plug, or metal plate disposed in the center console 16. It will be apparent to those skilled in the vehicle field that the electrical connector C1 is an electromechanical device used to join electrical terminations and create an electrical circuit. As shown, the center console 16 further has a center console harness 26. The center console harness 26 is electrically connected to the connector C1. The center console 16 includes an electrical wiring system for powering accessory components of the vehicle 10, such as driver side and passenger side footwell lights and/or front and rear footwell lights, cigar lighter, USB ports, etc.

The center console harness 26 is electrically connected to a main power supply of the vehicle 10, such as the vehicle battery (not shown), via a main body harness 26A in a conventional manner. Further, The center console harness 26 is an example of an accessory harness that is connected to the electronic heating unit 24. In the illustrated embodiment, the accessory harness includes one or more organized set of electrical wires, terminals and connectors for transferring electrical power to accessory components of the vehicle 10, such as interior and exterior lights/lamps, audio systems and stereos, wireless transmitters for mobile device(s), etc. It will also be apparent to those skilled in the vehicle field from this disclosure that the vehicle holding unit 14 can be directly connected to the main body harness 26A to receive electrical power from the main body harness 26A. In the illustrated embodiment, the vehicle holding unit 14 is electrically connected to the center console harness 26 of the center console 16 so that the center console harness 26 supplies electrical power to the vehicle holding unit 14, including to the cupholder 22. Therefore, the vehicle holding unit 14 is electrically connected to the vehicle's 10 battery via the center console harness 26 of the center console C and the main body harness 26A.

Figure 3:
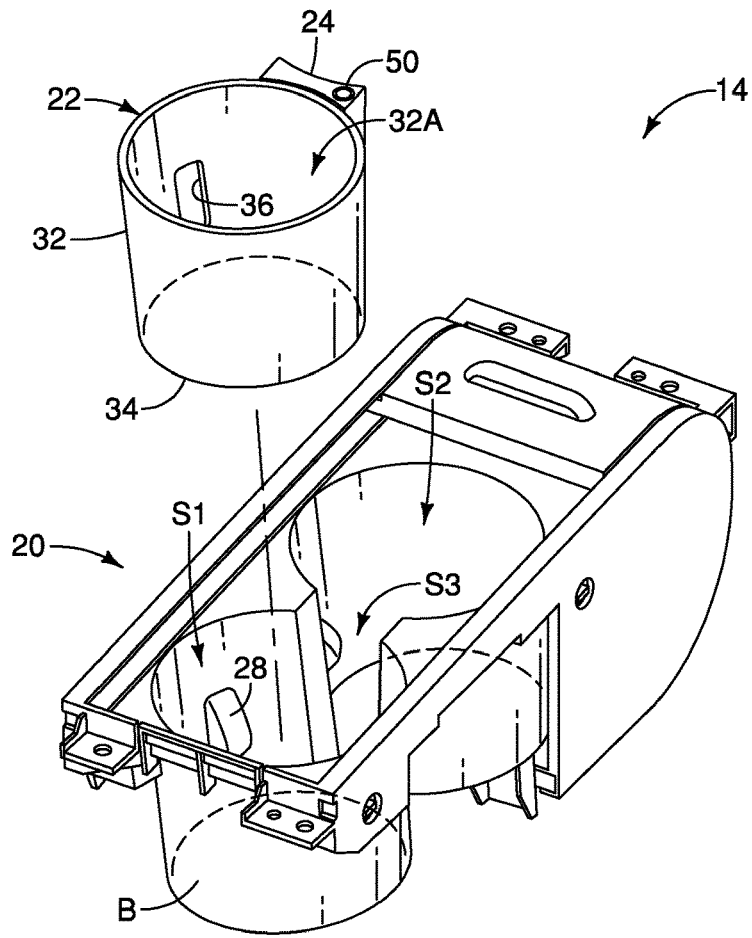
FIG. 3 is a exploded view of the vehicle holding unit showing a cupholder with an electronic heating unit and a storage compartment of the center console.

Referring to FIGS. 1 to 4, the storage compartment 20 includes a first receiving space S1, a second receiving space S2 and an intermediate space S3 connecting the first and second receiving spaces S1 and S2. The first and second receiving spaces S1 and S2 are substantially circular openings that are for holding or containing beverage container(s) 21. As best seen in FIGS. 2 and 3, the storage compartment 20 includes at least one retention arm 28 biased towards the first receiving space S1 of the center console 16 from a storage recess 30. In the illustrated embodiment, the storage compartment 20 includes a plurality of retention arms 28 that extend into the first and second receiving spaces S1 and S2. The retention arms 28 help secure the beverage container 21 that is smaller in diameter than the first and second receiving spaces S1 and S2 within the first and second receiving spaces S1 and S2. That is, the retention arms 28 are configured to abut the beverage container 21 within the first and second receiving spaces S1 and S2 so that the beverage container 21 can have a snug fit in the storage compartment 20. The retention arms 28 are spring biased into the first and second receiving spaces S1 and S2 from their corresponding storage recesses 30 in a conventional manner.

The retention arms 28 are illustrated as being examples only. It will be apparent to those skilled in the vehicle field from this disclosure that the storage compartment 20 can be made to include additional or fewer retention arms 28 as needed and/or desired. It will also be apparent to those skilled in the vehicle field from this disclosure that the cupholder 22 can be implemented with storage compartment 20(s) having no retention arms 28. It will be further apparent to those skilled in the vehicle field that the cup receiving area 32A of the center console 16 can include additional receiving spaces as needed and/or desired.

Figure 4:
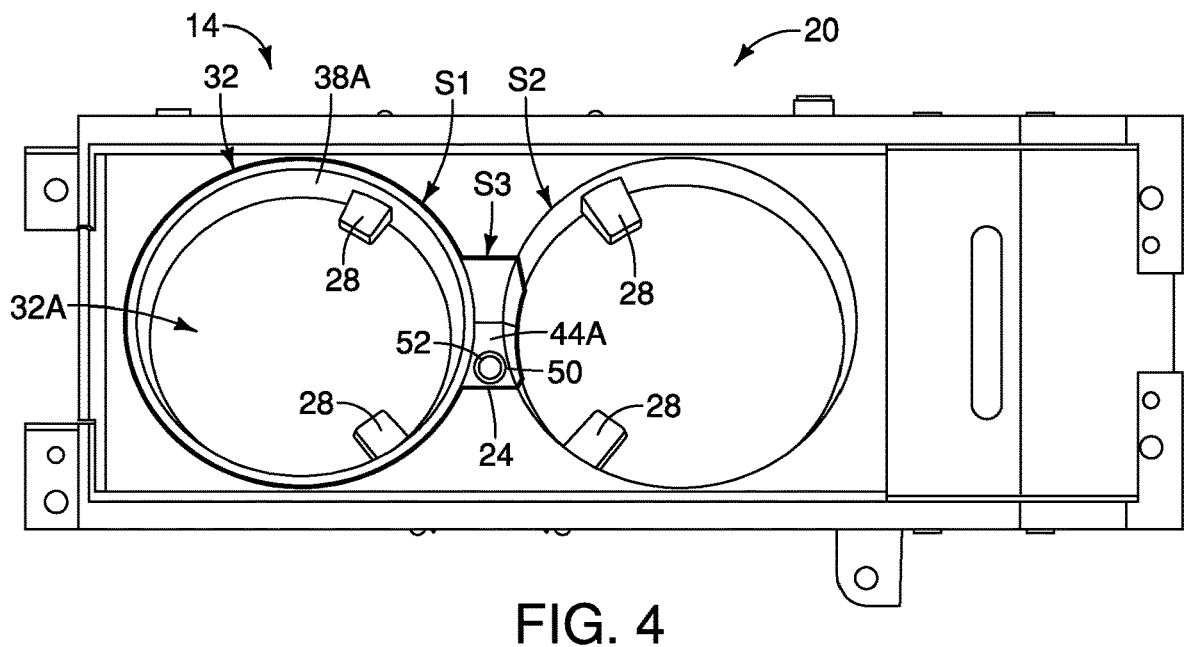
FIG. 4 is a top view of the storage compartment with the cupholder and electronic heating unit disposed therein.

As seen in FIGS. 3 and 4, the cupholder 22 is telescopically received in the first receiving space S1. The electronic heating unit 24 is telescopically received in the intermediate space S3. That is, the vehicle holding unit 14 is made for drop-in installation to the storage compartment 20 of the center console 16. It will be apparent to those skilled in the vehicle field that while the holding unit is illustrated as including a single cupholder 22 having a single electronic heating unit 24, it will be apparent to those skilled in the vehicle field that the holding unit can include additional cupholders equipped with an additional electronic heating unit 24, as will be further discussed below.

Figure 5:
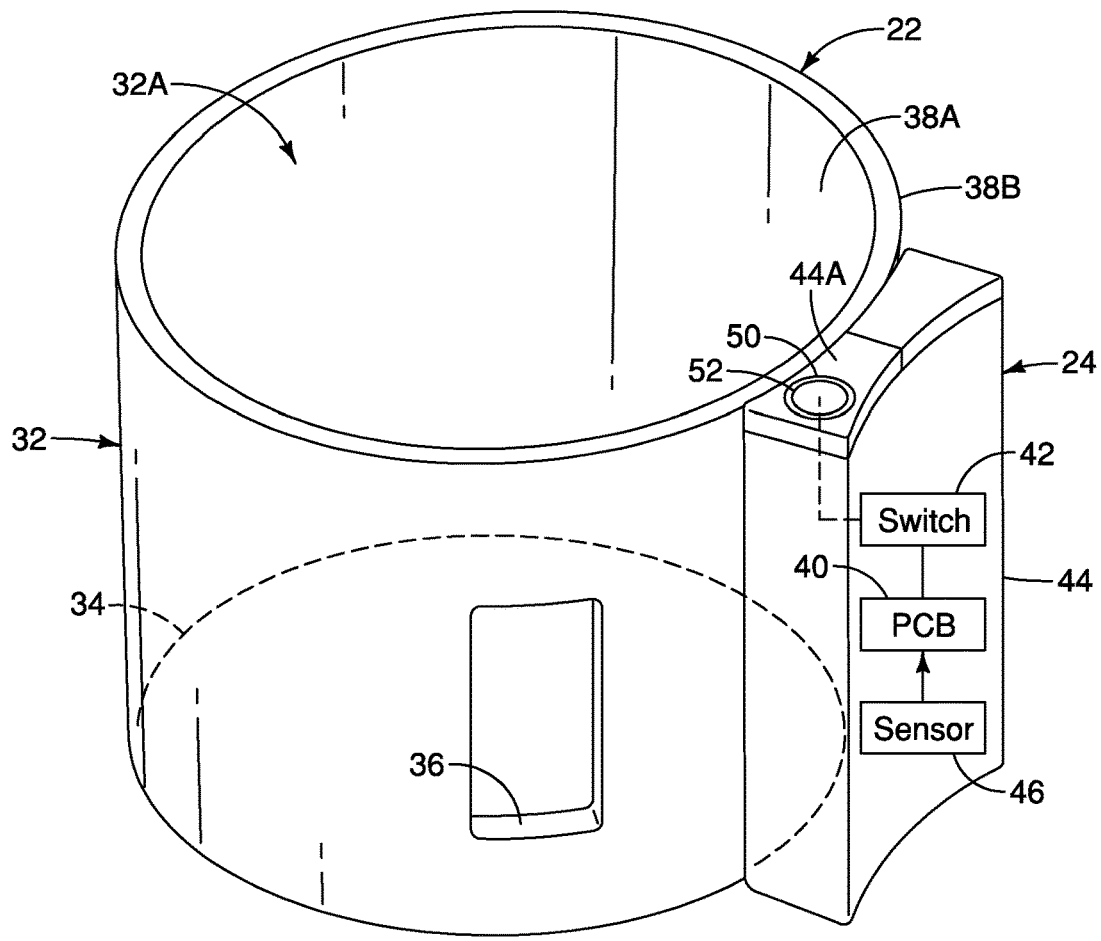
FIG. 5 is a side perspective view of the cupholder with the electronic heating unit.
Figure 6:
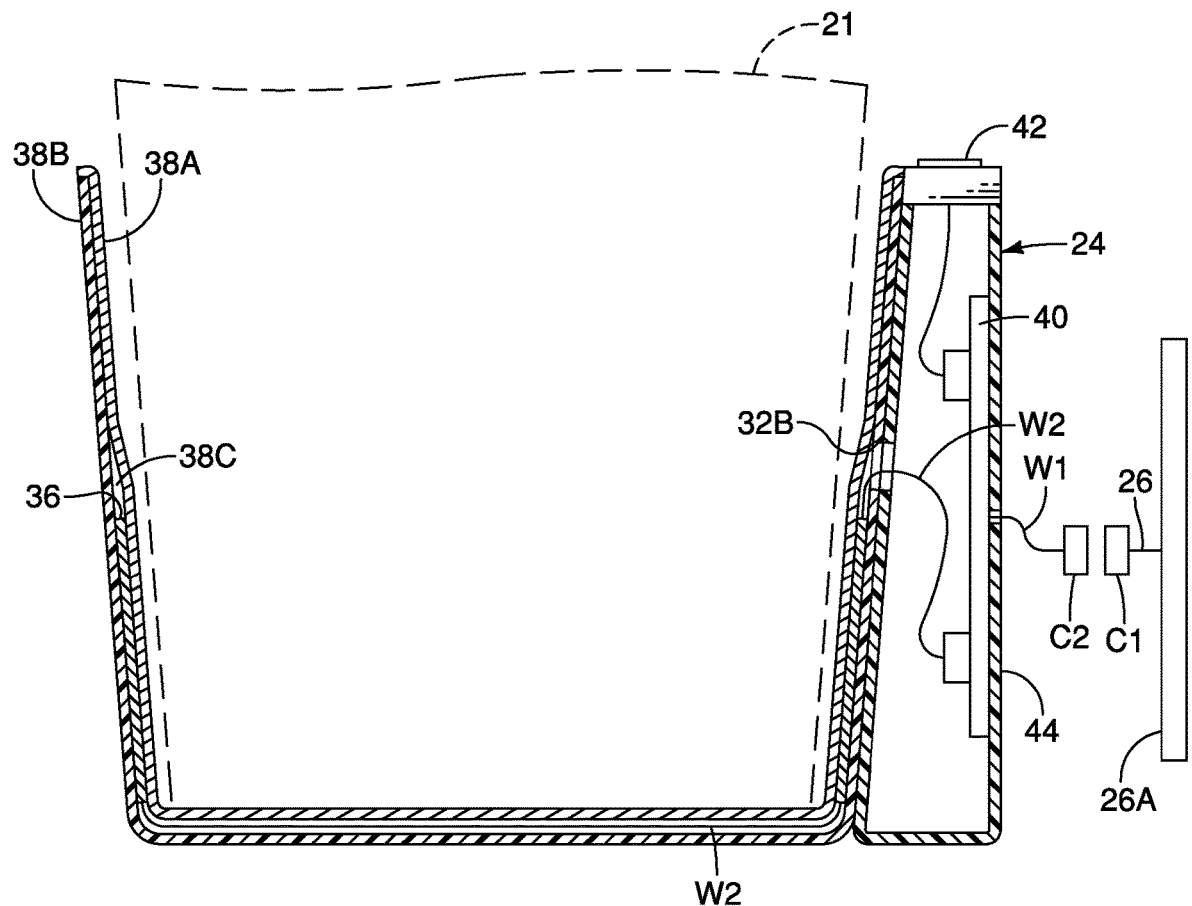
FIG. 6 is a cross-sectional view of the cupholder with a diagrammatic view of the electronic heating unit.

Referring to FIGS. 3 to 5, the cupholder 22 has a sidewall 32 defining a cup receiving area 32A. The sidewall 32 is cylindrical for holding and containing the beverage container 21. The cupholder 22 includes a bottom wall 34 that sits on a base B of the first receiving space S1. The sidewall 32 includes a heat source 36 that is electrically connected to the electronic heating unit 24 for providing heat to the cupholder 22, as shown in FIG. 6. The electronic heating unit 24 is integrated with the sidewall 32 of the cupholder 22. As best seen in FIGS. 4 and 5, the sidewall 32 of the cupholder 22 includes at least one opening 36 sized and dimensioned to correspond to the retention arm 28. The retention arm 28 extends through the at least one opening 36 into the cup receiving area 32A of the cupholder 22, as seen in FIG. 4. It will be apparent to those skilled in the vehicle field from this disclosure that the sidewall 32 can include additional openings 36 or no openings to accommodate storage compartments 20 having additional retention arms 28 or without retentions arms 28.

Referring to FIG. 6, the sidewall 32 of the cupholder 22 includes an interior layer 38A, an exterior layer 38B and a conductive space 38C disposed between the interior layer 38A and the exterior layer 38B. The interior layer 38A is an inner cylindrical wall and the exterior layer 38B is an outer cylindrical wall that is fixedly attached to the interior layer 38A by conventional means, such as via snap-fitting. Alternatively, the interior and exterior layers 38A and 38B can be integrally formed as a one-piece member with a space therebetween. The interior and exterior layers 38A and 38B are concentrically arranged and radially spaced apart by the conductive space 38C. The exterior layer 38B forms the bottom wall 34 of the cupholder 22. As shown in FIGS. 5 and 6, the electronic heating unit 24 is fixed to the exterior layer 38B of the sidewall 32.

The heat source 36 is housed in the conductive space 38C between the interior and exterior layers 38A and 38B of the sidewall 32. In particular, the cupholder 22 includes one or more conductive straps (or wires) that are electrically heated by electrical power from the center console harness 26. Therefore, the heat source 36 can be thin strips of metal such as copper or aluminum with strong heat conductive properties. The heat source 36 can also be made of semiconductor metals or metalloids. Alternatively, the heat source 36 can be one or more heating coils extending circumferentially between the interior and exterior layers 38A and 38B. The heat source 36 is interconnected to the center console harness 26 to receive electrical power from the center console harness 26 to heat the beverage. For example, as seen in FIG. 6, the electronic heating unit 24 can include one or more electrical wires W1 and W2 connecting the conductive straps to the center console harness 26, as will be discussed below.

The interior layer 38A is made of a conductive material that allows for heat transfer to the cup. Therefore, preferably, the interior layer 38A is made of metal such as aluminum for transferring heat to the beverage container 21. In the illustrated embodiment, the exterior layer 38B is made of an insulating material with little or no heat transferring properties. Preferably, the exterior layer 38B is made of a material with internal electric charges that do not flow freely and so that the exterior layer 38B has a higher heat resistivity than the interior layer 38A. Preferably, the exterior layer 38B is made of ceramic or plastic or other appropriate materials. Alternatively, the exterior layer 38B can be made of dielectric material that is a poor conductor of electric current. For example, the exterior layer 38B can be made of a dielectric material that is a poor conductor of electric current.

Referring to FIGS. 3 to 6, the electronic heating unit 24 will be further discussed. As stated, the electronic heating unit 24 is configured to be disposed in the intermediate space S3 between the first and second receiving spaces S1 and S2. Referring to FIGS. 5 and 6, the electronic heating unit 24 of the illustrated embodiment preferably includes an integrated module having a printed circuit board 40, an operation switch 42 and one or more electrical cables or wires W1 and W2. In particular, the electronic heating unit 24 includes a housing 44 that houses the printed circuit board 40 and the operation switch 42. Preferably, the electronic heating unit 24 also includes a temperature sensor 46, which will be further described below.

The housing 44 is fixedly attached to the exterior layer 38B of the cupholder 22 by conventional means, such as using fasteners (not shown)(e.g., a small bolt or screw) and/or by adhesive. The electronic heating unit 24 includes the electrical wires W1 and W2 for electrically connecting the heat source 36 with the center console harness 26. Therefore, exterior layer 38B of the sidewall 32 preferably includes an opening 32B for receiving the electrical wire W1, as seen in FIG. 6. In this way, the electronic heating unit 24 is integrated with the sidewall 32.

As seen in FIGS. 5 and 6, the electrical wire W1 is connected to an electrical connector C2 that is electrically connected to the electrical connector C1. In this way, the electronic heating unit 24 is electrically connected to the center console harness 26 of the center console 16 to transfer power from the center console 16 to the cupholder 22. Therefore, the electronic heating unit 24 has the electrical connector C2 configured to be electrically connected to the electrical connector C1 of the center console 16. Thus, the electronic heating unit 24 is electrically connected to the accessory harness of the vehicle 10 to draw electrical power from the accessory harness to power the heat source 36. The electronic heating unit 24 includes the electrical wire W1 extending from the electronic heating unit 24 to the accessory harness, as seen in FIGS. 1, 2, 5 and 6. The vehicle holding unit 14 preferably includes additional electrical connectors that can be mounted to the printed circuit board 40 to receive and transfer power from the center console harness 26 to the printed circuit board 40 of the electronic heating unit 24. In this way, the printed circuit board 40 is electrically connected to the heat source 36 of the cupholder 22 and is electrically connected to the accessory harness (e.g., the center console harness 26).

Referring to FIG. 4, the electronic heating unit 24 includes a user operation portion 50 disposed on an external surface of the electronic heating unit 24. The user operation portion 50 is operable to switch the electronic heating unit 24 between a heating state and a non-heating state. Preferably, the user operation portion 50 can be a push-button or a sliding switch that is activated by a user to turn the electronic heating unit 24 ON into the heating state and OFF into the non-heating state. In the illustrated embodiment, the heating state is a state in which the electronic heating unit 24 is ON and transfers electrical power from the center console harness 26 to the heat source 36 of the cupholder 22. The non-heating state is a state in which the electronic heating unit 24 is OFF and does not transfer electrical power from the center console harness 26 to the heat source 36.

In the illustrated embodiment, the user operation portion 50 includes the exterior surface 44A of housing 44. The user operation portion 50 is electrically connected to the operation switch 42 that is electrically connected to the printed circuit board 40. The user can depress the user operation portion 50 to operate the operation switch 42. As shown, the switch is electrically connected to the printed circuit board 40. Alternatively, the operation switch 42 can be mounted directly to the printed circuit board 40 to send ON and OFF signals to the printed circuit board 40. When the user operates the user operation portion 50, the operation switch 42 is activated to send an ON signal to the printed circuit board 40 which begins drawing electrical power from the center console harness 26.

The user operation portion 50 preferably includes indicia 52 that can indicate when the electronic heating unit 24 is in the heating state or the non-heating state, as seen in FIGS. 3 and 4. For example, the indicia 52 can be light such that the user operation portion 50 illuminates when the electronic heating unit 24 is in the heating state. The indicia 52 can be non-illuminated when the electronic heating unit 24 is in the non-heating state. Therefore, the external surface of the housing 44 can include the indicia 52 that corresponds to the user operation portion 50 to indicate the heating state and the non-heating state of the electronic heating unit 24. It will be apparent to those skilled in the vehicle field from this disclosure that the indicia 52 can be provided at other locations of the holding unit or on different surfaces of the center console 16, as needed and/or necessary. Additionally, the indicia 52 can be color. For example, the user operation portion 50 can illuminate a green light when the electronic heating unit 24 is in the heating state, and can illuminate a red light when the electronic heating unit 24 is in the non-heating state.

As stated, the electronic heating unit 24 further includes the temperature sensor 46 for sensing a temperature of the sidewall 32 when the electronic heating unit 24 is in the heating state. The electronic heating unit 24 of the illustrated embodiment is configured to switch from the heating state to the non-heating state when the temperature sensor 46 detects that the sidewall 32 is at a prescribed temperature. In the illustrated embodiment, the prescribed temperature is a temperature ranging from 57 to 60 degrees Celsius. Therefore, when the temperature sensor 46 detects that the sidewall 32 has reached the prescribed temperature, the temperature sensor 46 sends an OFF signal to the printed circuit board 40 to turn the electronic heating unit 24 into the non-heating state. The temperature sensor 46 can be a thermometer or a thermistor or other types of temperature sensor(s) that are appropriate.

Figure 7:
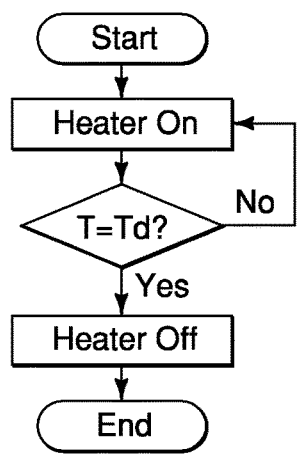
FIG. 7 is a flowchart of a control system integrated with the electronic heating unit.
Figure 8:
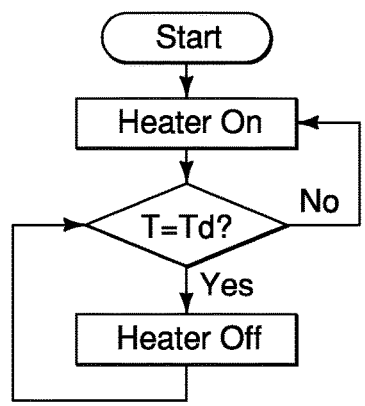
FIG. 8 is another flowchart of a control system integrated with the electronic heating unit.

Referring to FIGS. 7 and 8, the electronic heating unit 24 includes one or more control systems for operating the electronic heating unit 24 between the heating and non-heating states. The control system 54 preferably comprises the user operation portion 50, the operation switch 42, the printed circuit board 40, and the temperature sensor 46. As illustrated in FIG. 7, the electronic heating unit 24 can be programmed to operate in the heating state only upon the user operation of the user operating portion 50. The user turns the electronic heating unit 24 ON into the heating state by operating the user operating portion. The electronic heating unit 24 begins drawing power from the center console harness 26 to electrically power the heat source 36 of the cupholder 22. The temperature sensor 46 is also activated to begin detecting the temperature of the sidewall 32. When the prescribed temperature is reached, the temperature sensor 46 sends an OFF signal to the printed circuit board 40 to switch electronic heating unit 24 to the non-heating state. However, if the prescribed temperature has not yet been reached, the electronic heating unit 24 continues to provide power to the heat source 36 to heat the cupholder 22.

Alternatively, the electronic heating unit 24 can be operated in accordance with an additional control system logic. For example, as illustrated in FIG. 8, the electronic heating unit 24 is always in the heating state unless the prescribed temperature has been reached and/or upon user operation of the user operating portion 50 to switch the electronic heating unit 24 into the non-heating state.

Figure 9:
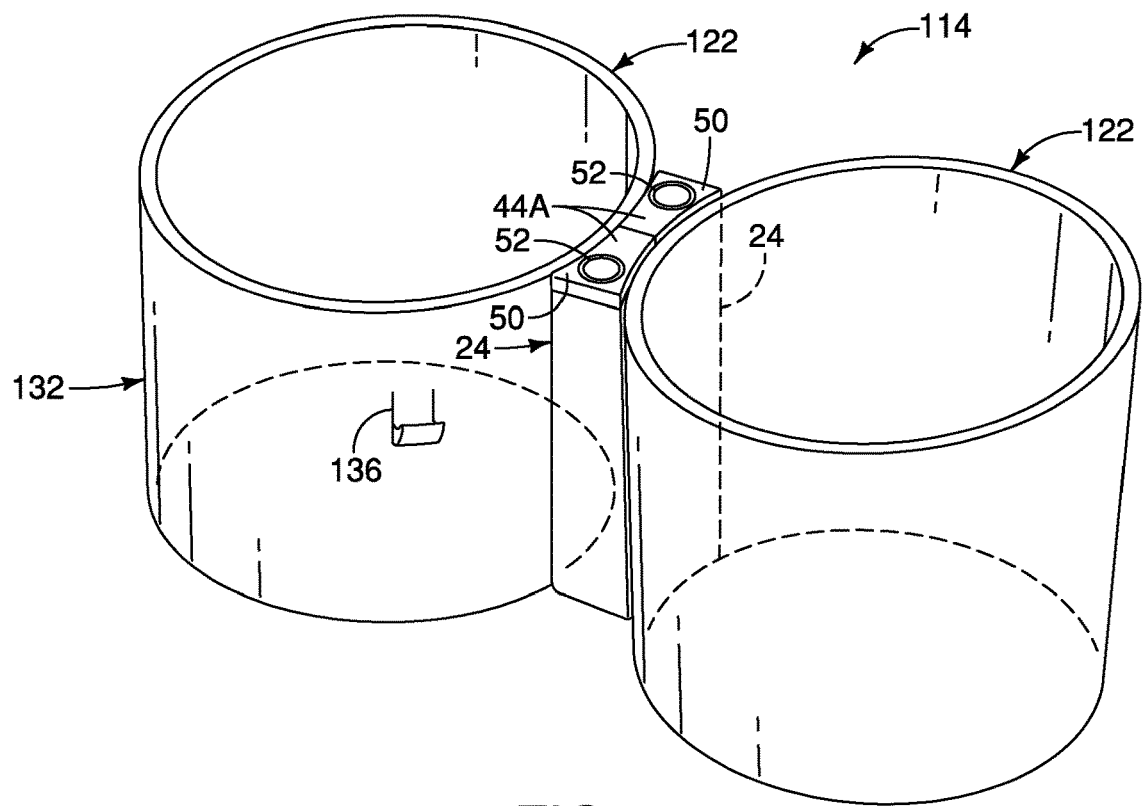
FIG. 9 is a perspective view of a pair of modified cupholders each equipped with an electronic heating unit.
Figure 10:
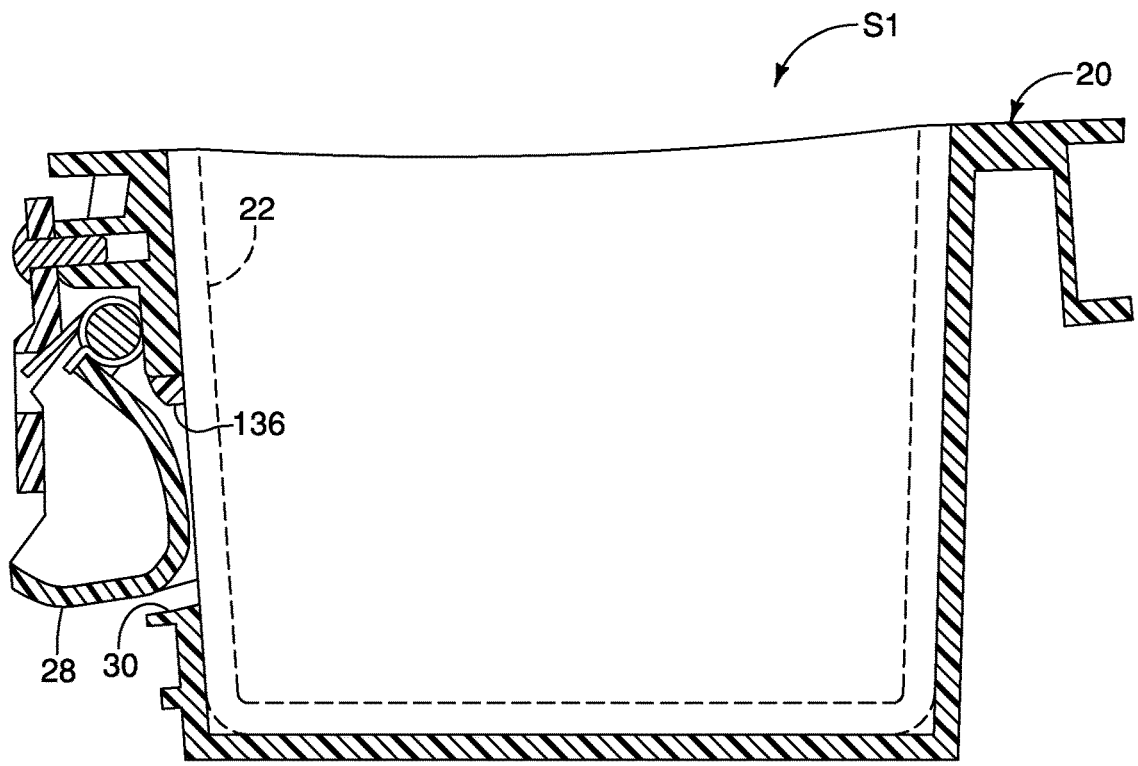
FIG. 10 is a cross-sectional view of one of the modified cupholders disposed in the storage compartment of the center console.

Referring to FIGS. 9 and 10, a modified holding unit 114 is illustrated in accordance with a modified illustrated embodiment. The modified heating unit includes a modified cupholder 122 having an electronic heating unit 24 that is identical to the electronic heating unit 24 of the main embodiment. Additionally, the modified holding unit 114 includes a pair of modified cupholders 122 each having an electronic heating unit 24. That is, the modified holding unit 114 further comprises an additional cupholder 122 having an additional sidewall 132 defining an additional cup receiving area 32A, as will be described below. The modified holding unit 114 further comprises the additional electronic heating unit 24 integrated with the additional sidewall 132 for providing heat to a heat source of the additional cupholder 122 in a similar manner as that described for the main embodiment. Therefore, the modified holding unit 114 is considered a dual-unit having a pair of cupholders 122 and a pair of electronic heating units 24 that are each integrated with one of the cupholders 122.

The modified holding unit 114 can be provided with the center console 16 of FIGS. 1 and 2. Thus, the modified holding unit 114 is configured to be telescopically received by the storage compartment 20 of the center console 16 in a similar manner as the holding unit 14. That is, the modified cupholder 122 can be telescopically received in first receiving space S1 of the center console 16. The additional cupholder 122 can be telescopically received in the second receiving space S2 of the center console 16. The electronic heating unit 24 and the additional electronic heating unit 24 are telescopically received in the intermediate space S3 of the center console 16. The electronic heating unit 24 and the additional electronic heating unit 24 are fixedly attached to each other.

The modified cupholders 122 of FIG. 9 are identical to each other and the electronic heating units 24 of FIG. 9 are identical to each other. For brevity, components of the modified cupholders 122 will receive the same reference numeral as corresponding components of the cupholder 22 but increased by 100. As the electronic heating unit 24 is identical to the electronic heating unit 24 of the main embodiment, corresponding components of the electronic heating unit 24 will receive the same reference numerals as the electronic heating unit 24 of the main embodiment.

As stated, the storage compartment 20 of the center console 16 includes retention arms 28 that are biased towards the into the storage compartment 20 from storage recesses 30. The modified cupholders 122 include modified sidewall 132 that include at least one fastener 136 disposed on the exterior layer 38B of the sidewall 132. That is, instead of an opening (e.g., the opening 36) to receive the retention arms 28, the modified sidewalls 32 can include one or more fasteners 136 for fastening cupholders 22 to the storage recesses 30 from which the retention arms 28 protrude, as seen in FIG. 9. As shown, the fasteners 136 are illustrated as hooks extending outward from the sidewall 32 to retain the cupholders 122 in the first and second receiving spaces S1 and S2. In this way, when the modified cupholders 122 are disposed in the storage compartment 20 of the center console 16, the retention arms 28 are retained in the storage recesses 30 by the modified sidewalls 132. For example, the fasteners 136 can be snap-fitted into the storage recesses 30. Therefore, the fasteners 136 attach into the storage recess 30 to retain the at least one retention arm 28 into the storage recess 30.

It will be apparent to those skilled in the vehicle field from this disclosure that the dual-unit of the modified holding unit 114 can be modified to include openings (similar to openings 36) along the sidewalls 132 to receive the retentions arms 28, as was described for the holding unit 14. It will also be apparent to those skilled in the vehicle field from this disclosure that the holding unit 14 can be modified to include fasteners 136 along the sidewall 32 of the cupholder 22 instead of the openings 36, as was described for the modified holding unit 114.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle holding unit. Accordingly, these terms, as utilized to describe the present invention should be interpreted relative to a vehicle equipped with the vehicle holding unit.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle holding unit comprising:
a cupholder having a sidewall defining a cup receiving area, the cupholder being configured to be received by a vehicle center console, the sidewall including a heat source for providing heat to the cupholder; and
an electronic heating unit integrated with the sidewall, the electronic heating unit having at least one electrical wire and an electrical connector configured to be electrically connected to another electrical connector by the at least one electrical wire that extends into the vehicle center console to draw electrical power from the another electrical connector to power the heat source such that the at least one electrical wire is a hidden wire that is not exposed from the vehicle center console when the cupholder is received by the vehicle center console.

2. The vehicle holding unit according to claim 1, further comprising
the center console of the vehicle, the center console having an accessory harness that is connected to the electrical connector of the electronic heating unit via the another electrical connector.

3. The vehicle holding unit according to claim 2, wherein
the center console has a storage compartment, the cupholder being telescopically received in the storage compartment of the center console.

4. The vehicle holding unit according to claim 3, wherein
the storage compartment of the center console includes a first receiving space, a second receiving space and an intermediate space connecting the first and second receiving spaces,
the cupholder being telescopically received in the first receiving space, the electronic heating unit being telescopically received in the intermediate space.

5. A vehicle holding unit comprising:
a cupholder having a sidewall defining a cup receiving area, the sidewall including a heat source for providing heat to the cupholder; and
an electronic heating unit integrated with the sidewall, the electronic heating unit having an electrical connector configured to be electrically connected to another electrical connector of a vehicle center console to draw electrical power from the another electrical connector to power the heat source,
the center console having a storage compartment, the cupholder being telescopically received in the storage compartment of the center console,
the storage compartment including at least one retention arm biased towards the first receiving space of the center console from a storage recess,
the sidewall of the cupholder including at least one opening sized and dimensioned to correspond to the at least one retention arm, the at least one retention arm extending through the at least one opening into the storage compartment of the cupholder.

6. The vehicle holding unit according to claim 4, wherein
the storage compartment includes at least one retention arm biased towards the first receiving space of the center console from a storage recess,
the sidewall of the cupholder includes at least one fastener disposed on an exterior surface of the sidewall, the at least one fastener attaching into the storage recess to retain the at least one retention arm into the storage recess.

7. The vehicle holding unit according to claim 4, wherein
the electronic heating unit includes a user operation portion disposed on an external surface of the electronic heating unit, the user operation portion being operable to switch the electronic heating unit between a heating state and a non-heating state.

8. The vehicle holding unit according to claim 7, wherein
the external surface of the electronic heating unit includes indicia that corresponds to the user operation portion to indicate the heating state and the non-heating state of the electronic heating unit.

9. The vehicle holding unit according to claim 8, wherein
the electronic heating unit further includes a temperature sensor for sensing a temperature of the sidewall when the electronic heating unit is in the heating state.

10. The vehicle holding unit according to claim 9, wherein
the electronic heating unit is configured to switch from the heating state to the non-heating state when the temperature sensor detects that the sidewall is at a prescribed temperature.

11. The vehicle holding unit according to claim 2, wherein
the sidewall of the cupholder includes an interior layer, an exterior layer and a conductive space disposed between the interior layer and the exterior layer,
the heat source being housed in the conductive space.

12. The vehicle holding unit according to claim 11, wherein
the electronic heating unit is fixed to the exterior layer of the sidewall.

13. The vehicle holding unit according to claim 12, wherein
the exterior layer is made of an insulating material.

14. The vehicle holding unit according to claim 12, wherein
the at one electrical wire extends from the electronic heating unit to the accessory harness, the at least one electrical wire having the electrical connector.

15. The vehicle holding unit according to claim 7, wherein
the electronic heating unit includes a housing that houses a printed circuit board, the printed circuit board being electrically connected to the heat source of the cupholder and being electrically connected to the accessory harness.

16. The vehicle holding unit according to claim 15, wherein
the housing of the electronic heating unit houses a switch that is electrically connected to the user operation portion and is electrically connected to the printed circuit board.

17. The vehicle holding unit according to claim 4, further comprising
an additional cupholder having an additional sidewall defining an additional cup receiving area, and
an additional electronic heating unit integrated with the additional sidewall for providing heat to a heat source of the additional cupholder.

18. The vehicle holding unit according to claim 17, wherein
the additional cupholder is telescopically received in the second receiving space, and the additional electronic heating unit is telescopically received in the intermediate space.

19. The vehicle holding unit according to claim 17, wherein the electronic heating unit and the additional electronic heating unit are fixedly attached to each other.

* * * * *